July 5, 1960 G. FRITZMEIER 2,943,885
ADJUSTABLE SUPPORT MEANS FOR A ROOF OF A VEHICLE
Filed Aug. 14, 1957 3 Sheets-Sheet 1

July 5, 1960 G. FRITZMEIER 2,943,885
ADJUSTABLE SUPPORT MEANS FOR A ROOF OF A VEHICLE
Filed Aug. 14, 1957 3 Sheets-Sheet 2

Inventor
Georg Fritzmeier
By
Michael S. Striker
Attorney

July 5, 1960  G. FRITZMEIER  2,943,885
ADJUSTABLE SUPPORT MEANS FOR A ROOF OF A VEHICLE
Filed Aug. 14, 1957  3 Sheets-Sheet 3

United States Patent Office 2,943,885
Patented July 5, 1960

2,943,885

ADJUSTABLE SUPPORT MEANS FOR A ROOF OF A VEHICLE

George Fritzmeier, Grosshelfendorf, near Munich, Germany

Filed Aug. 14, 1957, Ser. No. 678,088

Claims priority, application Germany July 22, 1957

3 Claims. (Cl. 296—102)

The present invention relates to vehicles.

More particularly, the present invention relates to the roof of a vehicle such as a tractor or the like and to a means for adjusting the position of the roof to take care of all weather conditions.

One of the objects of the present invention is to provide for a vehicle of the above type a roof which may have its position adjusted so that the roof may protect the operator of the vehicle from such weather conditions as the sun, rain, etc.

Another object of the present invention is to provide a roof of a vehicle with an adjusting means which enables the adjusting means to be set in any desired position without in any way interfering with the comfort of the operator of the vehicle or of a passenger beside the operator.

A further object of the present invention is to provide a roof adjusting means which is particularly suitable for tractors or the like.

It is also an object of the present invention to provide a structure capable of accomplishing all of the above objects and at the same time composed of simple and ruggedly constructed elements which are very reliable in operation.

With the above objects in view, the present invention includes in a vehicle a roof which is located over the operator of the vehicle and a support means supporting the roof on the vehicle for turning movement about a substantially horizontal axis which is located at an intermediate portion of the roof between the ends thereof. Also, the invention includes a means for fixing the roof in an adjusted angular position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
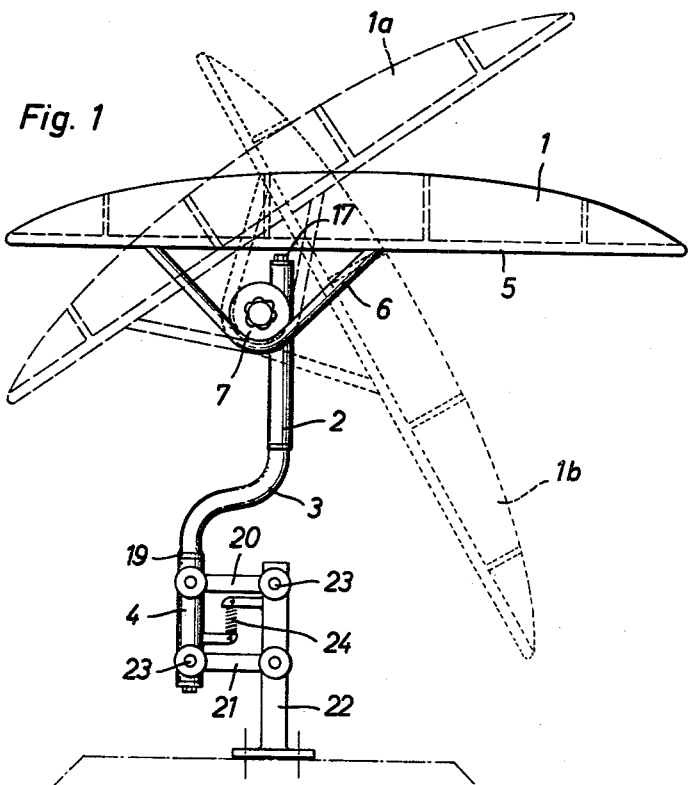
Fig. 1 is a side elevational view of a roof and a support means therefor, according to the present invention, Fig. 1 showing several positions in which the roof may be placed.
Figure 2:
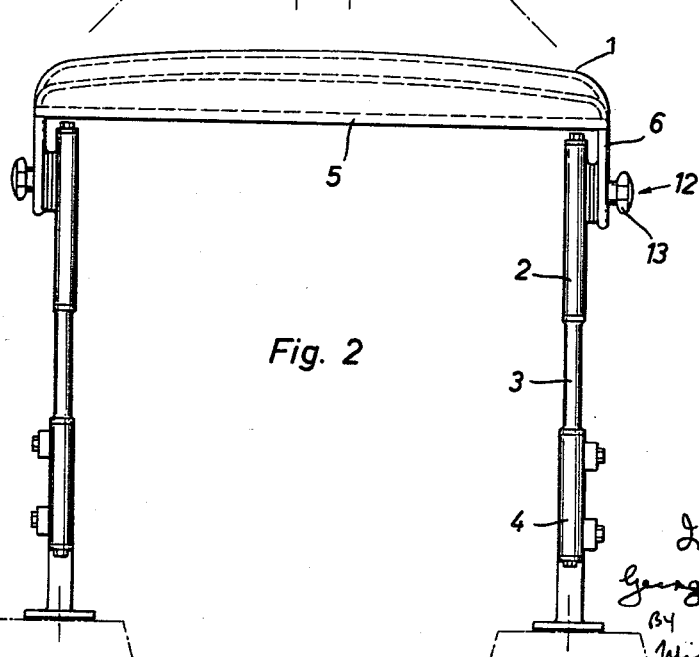
Fig. 2 is a front elevational view of the structure of Fig. 1.
Figure 3:
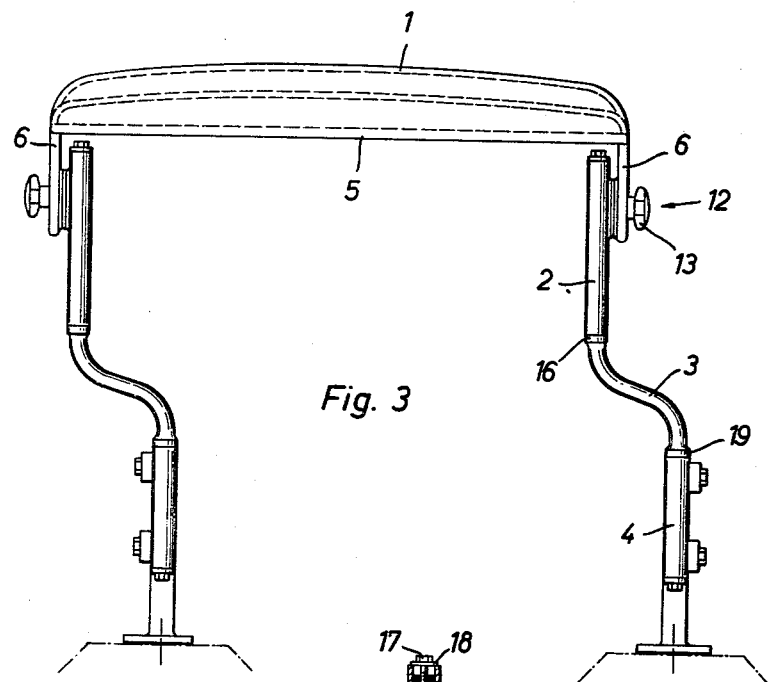
Fig. 3 is a view of the structure of Fig. 2 after the roof has been laterally shifted to another position.
Figure 4:
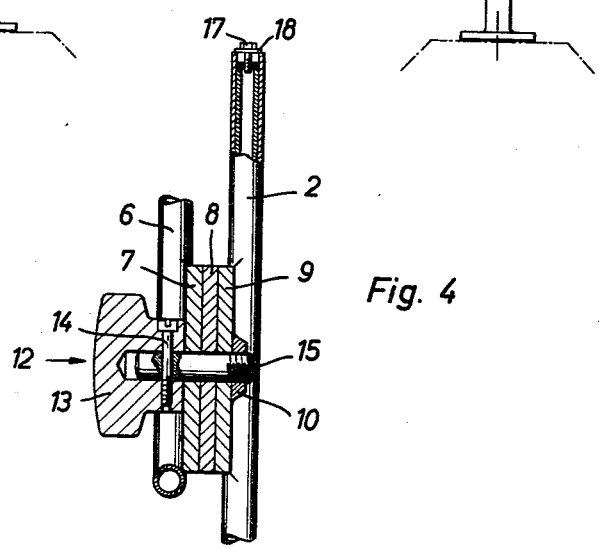
Fig. 4 is a fragmentary sectional elevational view showing a structure for fixedly connecting the roof in an adjusted angular position.

According to the embodiment of the invention which is illustrated in Figs. 1–4, the roof 1 of the vehicle is carried by a pair of elongated supports each of which is composed of a set of three tubular members 2, 3 and 4, these members being telescoped one within the other. The roof 1 is provided with a frame 5, located at the edge of the roof, and at each of the sides of the roof the frame 5 is fixedly connected with a substantially V-shaped member 6 which may be in the form of an angularly bent tube fixed at its ends to the frame 5 as by being welded thereto. At the junction between the pair of arms of each member 6 a disc 7 is fixed thereto as by being welded thereto, this disc 7 being made of a rigid metal and being formed with a central opening (Figs. 1 and 4). A disc 8 made of a soft elastic material such as rubber or the like is located next to each member 7 and is formed with a central opening aligned with the opening of the member 7, and against the face of each plate 8 which is distant from the member 7 there is located a plate 9 which is also made of a rigid material and which also has an opening aligned with the openings of the members 7 and 8. The plates 9 are respectively fixed, as by welding or the like, to the pair of tubular members 2 which form the uppermost members of each set of tubular members. The two sets of plates 7–9 are coaxial with each other and each plate 9 has fixed to its outer face as by welding a nut 10 whose threaded bore is also coaxial with the bores of the plates 7–9.

When the roof is fixed in an adjusted angular position each pair of plates 7 and 9 clamp between themselves the elastic plate 8 so that slippage of the plates 7 and 9 with respect to each other is prevented in this way. The fixing of the pair of plates 7 and 9 with respect to each other as well as the fixing of the roof in an adjusted angular position is brought about by a screw means 12 which includes a knob 13 for each set of plates 7–9 and a screw member 14 passing through the knob 13 and through a transverse bore of the screw member 15 for fixing the screw member 15 to the knob 13. The screw members 15 respectively pass through the aligned bores of the sets of plates 7–9 into threaded engagement with the nuts 10, as is evident from Fig. 4. The pair of screw members 15 in addition to serving to releasably fix the roof in an adjusted angular position also serve to define the turning axis of the roof 1.

If it is desired, for example, to turn the roof from the solid line position thereof shown in Fig. 1 into the position 1a, as when the sun is located in front of the operator, or if it is desired to place the roof 1 in the position 1b shown in Fig. 1, in order to open the cab of the vehicle under pleasant weather conditions, then it is only necessary for the operator to engage the pair of knobs 13 so as to loosen each of the screw means 12, to turn the roof to the desired position, and then to again tighten the screw means so as to maintain the roof in its adjusted angular position.

In order to protect the operator from lateral weather influences such as rain or sun which disturb the operator from the sides of the vehicle, it is also possible to laterally adjust the roof, as is evident from a comparison of Figs. 2 and 3. For this purpose the telescoped sets of members 2—4 cooperate with each other so that they may be turned one with respect to the other. The member 3 has its end portions extending into the members 2 and 4 of each set of tubular members. It will be noted that the members 3 are each of crank-shaped configuration, so that in this way during turning of the tubes with respect to each other lateral movement of the roof between the positions shown in Figs. 2 and 3 is rendered possible. The upper member 2 of each set of tubular members rests upon a collar 16 fixed to the member 3. As is apparent from Fig. 4 a screw member 17 extends threadedly into engagement with a member fixed to the top end of the tube 3 within each member 2, and the head of the screw member 17 rests against a washer 18 which may be fixed to the top end of the member 2, so that by tightening the screw 17 it is possible to fix the pairs of members 2 and 3 with respect to each other in an adjusted angular position about the axis of the member 2. The screw members 17 may also take the form of wing screws. The members 3 are respectively provided with collars 19 fixed thereto and resting on the top ends of the members 4, and at any time the members 3 may simply be raised out of the members 4, respectively.

It is evident from Fig. 1 that the members 4 respectively form parts of a pair of parallelogram linkages. Each of these parallelogram linkages includes in addition to the member 4 the arms 20, 21, and 22, the latter arm being fixed directly to the vehicle and the arms 20 and 21 being parallel to each other. The pivotal connections 23 serve to interconnect the arms of each parallelogram linkage with each other, and a pair of arms are fixed to the arms 4 and 22 of each linkage and are interconnected at their free ends by a coil spring 24 as is evident from Fig. 1. Furthermore, each of the pivot means 23 is provided with a rubber sleeve, and these rubber sleeves of the four pivot means 23 together with the coil spring 24 serve to provide a springy mounting for the roof which insulates the same against vibrations of the vehicle during traveling thereof.

Figure 5:
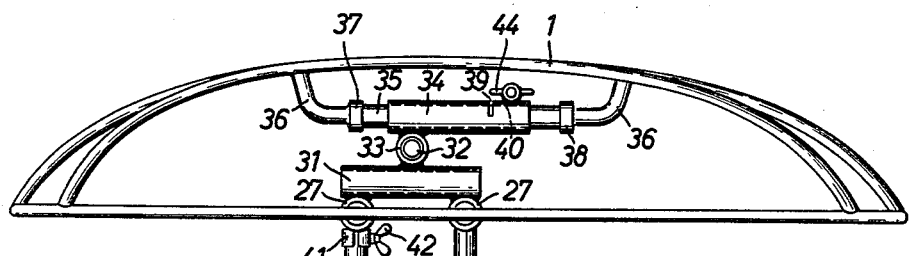
Fig. 5 is a side elevational view of another embodiment of a structure for supporting the roof in accordance with the present invention.
Figure 6:
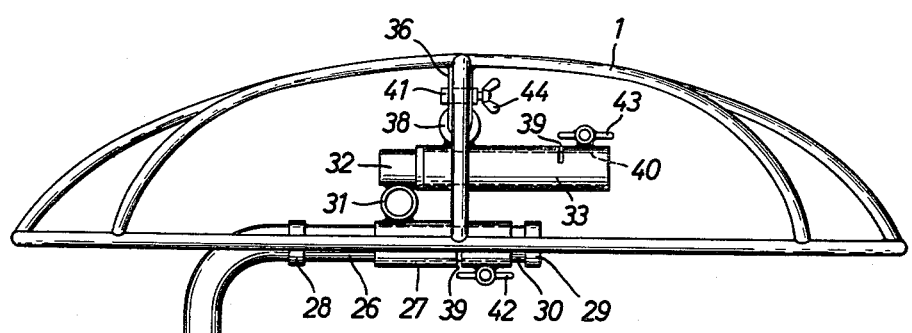
Fig. 6 shows the structure of Fig. 5 as seen from the rear of the vehicle.

According to the embodiment of the invention which is illustrated in Figs. 5 and 6, the roof 1 is carried by a pair of elongated support members 25 which may also be in the form of a pair of tubes. The members 25 are fixed to the same side of the vehicle at their bottom ends which are not illustrated in Figs. 5 and 6 and which are fixed in any suitable way to the body of the vehicle in the same way as the members 22, for example. Each of the elongated support members 25 is provided at its top end with a horizontally extending arm 26 which extends transversely of the vehicle, and these arms 26 are spaced from and parallel to each other, the arms 26 respectively forming continuations of the tubular members 25. Of course, it is possible to make the arms 26 separate from the member 25 and to fix them to the member 25 in any siutable way. The parallel arms 26 which extend transversely of the vehicle are located at an elevation sufficiently high so that they will not disturb the operator, as is apparent from Fig. 6. Each of the arms 26 passes through a sleeve 27 is shiftable on the arm 26. The shifting movement of the sleeve 27 on each arm 26 is limited by a pair of stops 28 and 29. The stop 28 is in the form of a collar fixed to the arm 26, while the stop 29 is in the form of the head of a bolt or pin which extends into and is fixed to the arm 26.

The pair of sleeves 27 are fixed to each other at their ends adjacent to the upwardly extending support 25 by a bridge member 31 extending between and fixed to the sleeve 27 as by being welded thereto, although it is also possible for the bridge member 31 to be located between the sleeves 27 at the elevation of the arms 26, if desired. This bridge member 31 may also be in the form of a tube.

A horizontal shaft 32 is fixed adjacent its left end, as viewed in Fig. 6, to the bridge member 31 at a central portion thereof, as is apparent from Fig. 5, and the shaft 32 extends perpendicularly with respect to the bridge member 31, so that the shaft 32 extends transversely of the vehicle. A tube 33 receives the shaft 32 in its interior and is turnable about the axis of the shaft 32. This tube 33 is fixedly connected, as by welding, for example, with a second tube 34 which extends perpendicularly with respect to the tube 33 adjacent the left end of the latter, as viewed in Fig. 6, and this tube 34 extends longitudinally of the vthicle. The axes of the tubes 33 and 34, respectively, are substantially horizontal. A shaft 35 extends through the sleeve 34, as is shown most clearly in Fig. 5, and this shaft 35 is longitudinally shiftable in and turnable with the sleeve 34, shaft 35 extending in the longitudinal direction of the vehicle. At its ends the shaft 35 is provided with a pair of upwardly extending arms 36 which are fixed directly to the roof. The shaft 35 has fixedly connected thereto a pair of collars 37 and 38 which act as stop members to limit the extent of the axial shifting of the shaft 35 with respect to the tube 34.

Each of the tubes 27, 33, and 34 is provided with a transverse slot 39 as well as with a longitudinal slot 40 leading from the slot 39 to an end of the tube. At both sides of the longitudinal slot 40 each of these tubes has a pair of eyes 41 fixed thereto, and at least one of these eyes is threaded at its inner periphery, and a wing screw member 42 extends through each pair of eyes into threaded engagement with the eye most distant from the head of the wing screw, so that these wing screws may be turned to cause each tube to be releasably fixed with the shaft extending through the same. Thus, the wing screw 42 may be turned to fix the left sleeve 27 of Fig. 5 to the arm 26, and if desired the right sleeve 27 of Fig. 5 may be provided with a similar releasable fixing means. Also, as is evident from Fig. 6, the wing screw 43 may be turned so as to releasably fix the tube 33 in an adjusted angular position on the shaft 32, and in the same way the wing screw 44 may be turned for releasably fixing the shaft 35 in an adjusted angular and axial position with respect to the sleeve 34.

By loosening the wing screw 42 the roof 1 may be laterally shifted with the sleeve 27 moving within the limits determined by the stops 28 and 29. By loosening the wing screw 43, it is possible to turn the roof forwardly or rearwardly about the axis of the transversely extending shaft 32. Also, by loosening the screw 42 it is possible to turn the roof about a longitudinal axis downwardly to the left or right and also it is possible to axially shift the roof forwardly or rearwardly within the limits determined by the stops 37 and 38. Once the desired position of the roof is reached the roof may be releasably fixed in this position by tightening the screws 42—44. Thus, it is possible with this structure to place the roof in any desired position so as to protect the operator against weather conditions.

If the vehicle is of the type where a pair of persons sit beside each other and the roof 1 extends over both seats, then the arrangement is such that the roof in its normal position uniformly covers both seats. On the other hand, if there is only one seat, as in the case particularly in mowing machines and the like, then the roof in its normal position is situated centrally over the operator.

It will be noted that the transverse horizontal turning axis of the roof is located substantially centrally beneath the same and is at least located beneath an intermediate portion of the roof which is located between the front and rear ends thereof, while the longitudinal turning axis of the roof is located also beneath an intermediate portion of the roof which is substantially centrally located between the right and left sides of the roof.

It will be understood that each of the elements described above, or two or more together, may also find a useful application in other types of vehicles differing from the types described above.

While the invention has been illustrated and described as embodied in adjustable vehicle roofs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle, in combination, a pair of elongated support members extending upwardly from the same side of the vehicle and respectively having horizontally extending arms at their upper ends, said arms extending transversely across the vehicle; a first shaft fixedly carried by said arms and also extending transversely across the vehicle; a first tube into which said first shaft extends and being turnable about the axis thereof; a second tube fixed to the transversely extending tube and extending longitudinally of the vehicle; a second shaft extending through said second tube and being turnable therein, said second shaft having a pair of end portions fixedly connected with the roof so that said second shaft cooperates with said second tube to support the roof for turning movement about a longitudinal axis, said first tube and shaft cooperating together to support said roof for turning movement about a transverse axis, and said second shaft being longitudinally shiftable in said second tube so that the position of the roof may be adjusted in a longitudinal direction; and a pair of independent means for respectively releasably fixing said first tube in an adjusted position on said first shaft and for releasably fixing said second tube in an adjusted position on said second shaft.

2. In a vehicle, in combination, a pair of elongated support members extending upwardly from the same side of the vehicle and respectively having horizontally extending arms at their upper ends, said arms extending transversely across the vehicle; a first shaft fixedly carried by said arms and also extending transversely across the vehicle; a first tube into which said first shaft extends and being turnable about the axis thereof; a second tube fixed to the transversely extending tube and extending longitudinally of the vehicle; a second shaft extending through said second tube and being turnable therein, said second shaft being longitudinally shiftable in said second tube and having a pair of end portions fixedly connected with the roof so that said second shaft cooperates with said second tube to support the roof for turning movement about a longitudinal axis and so that the position of said roof may be adjusted in a longitudinal direction, said first tube and shaft cooperating together to support said roof for turning movement about a transverse axis; means connecting said first shaft to said arms for horizontal shifting movement therealong, so that the lateral position of said roof may be adjusted; and a pair of independent means for respectively releasably fixing said first tube in an adjusted position on said first shaft and for releasably fixing said second tube in an adjusted position on said second shaft.

3. In a vehicle, in combination, a roof; a pair of support members fixed to the vehicle and extending upwardly therefrom toward the roof, said support members respectively having a pair of parallel arms at their top ends extending transversely across the vehicle; a pair of sleeves through which said arms respectively extend, said sleeves being shiftable along said arms; a bridge member extending from one of said sleeves to the other of said sleeves and being fixed thereto, said bridge member extending longitudinally of the vehicle; a first shaft fixed to said bridge member and extending perpendicularly therefrom transversely of the vehicle; a first tube into which said first shaft extends, said first tube being turnable about said first shaft; a second tube fixedly connected to said first tube and extending perpendicularly therefrom in the longitudinal direction of the vehicle; a second shaft extending through and being turnable in said second tube and being fixed to said roof, and said second shaft being longitudinally shiftable in said second tube so that the position of said roof may be adjusted in longitudinal direction; and a plurality of independent means for releasably fixing at least one of said sleeves on the arm extending therethrough in an adjusted position thereon, for releasably fixing said first tube in an adjusted position on said first shaft, and for releasably fixing said second tube in an adjusted position on said second shaft.

References Cited in the file of this patent
UNITED STATES PATENTS

| | | |
|---|---|---|
| 201,561 | Simonson | Mar. 19, 1878 |
| 219,784 | Van Dyck | Sept. 16, 1879 |
| 238,672 | Golt et al. | Mar. 8, 1881 |
| 249,592 | Crandall | Nov. 15, 1881 |
| 311,809 | Butlin | Feb. 3, 1885 |
| 499,963 | Bunker | June 20, 1893 |
| 590,125 | Baltzell | Sept. 14, 1897 |
| 1,045,428 | Oder | Nov. 26, 1912 |
| 1,305,515 | Bessolo | June 3, 1919 |
| 1,717,515 | Linton | June 18, 1929 |
| 2,670,216 | Leonard | Feb. 23, 1954 |